MINING MACHINE HAVING CUTTER CHAIN SLACK TAKE-UP MEANS

Original Filed Jan. 4, 1952 3 Sheets-Sheet 1

Inventor
JAMES S. ROBBINS
By Murray A. Gleason
Attorney

MINING MACHINE HAVING CUTTER CHAIN SLACK TAKE-UP MEANS

Original Filed Jan. 4, 1952 3 Sheets-Sheet 2

Inventor
JAMES S. ROBBINS
By Murray A. Gleeson Attorney

MINING MACHINE HAVING CUTTER CHAIN SLACK TAKE-UP MEANS

Original Filed Jan. 4, 1952 3 Sheets-Sheet 3

Inventor

JAMES S. ROBBINS

By Murray A. Gleeson Attorney

United States Patent Office

Re. 24,523
Reissued Aug. 26, 1958

24,523

MINING MACHINE HAVING CUTTER CHAIN SLACK TAKE-UP MEANS

James S. Robbins, Seattle, Wash., assignor to Goodman Manufacturing Company, Chicago, Ill., a corporation of Illinois

Original No. 2,743,093, dated April 24, 1956, Serial No. 440,375, June 30, 1954, which is a division of Serial No. 264,880, January 4, 1952, now Patent No. 2,705,624, dated April 5, 1955. Application for reissue March 24, 1958, Serial No. 723,619

5 Claims. (Cl. 262—7)

Figure 1:
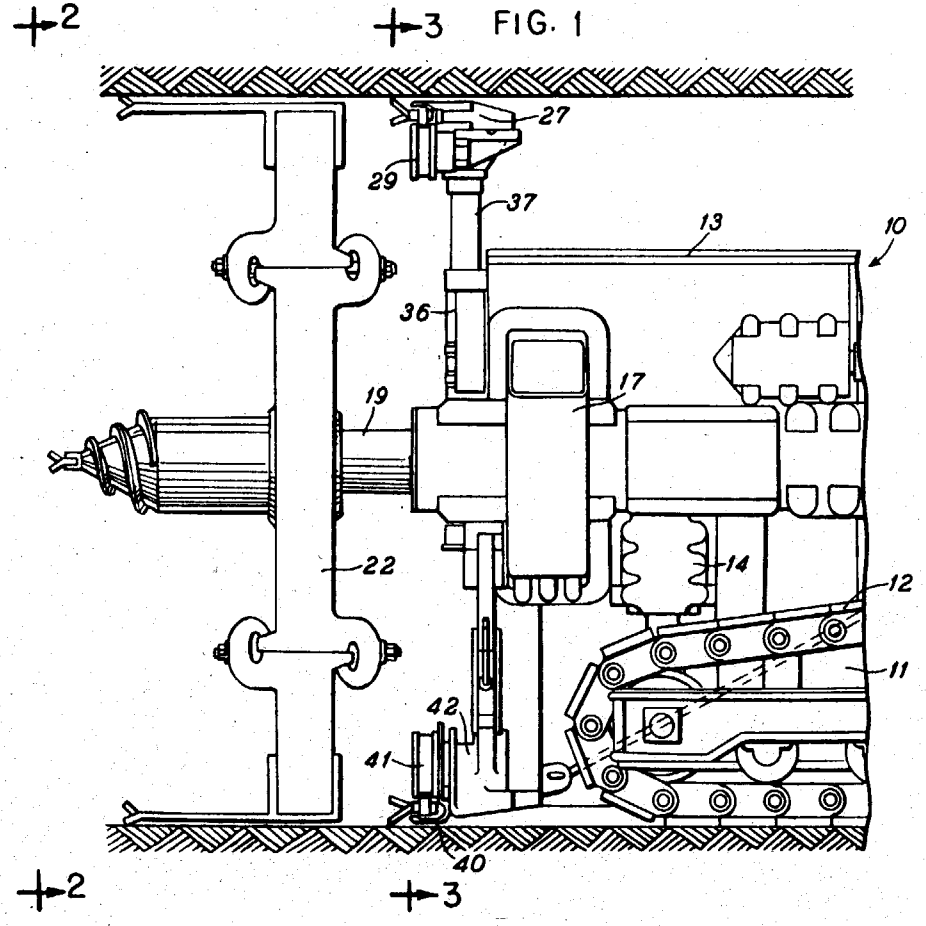

Matter enclosed in heavy brackets [ ] appears in the original patent but forms no part of this reissue specification; matter printed in italics indicates the additions made by reissue.

This invention relates generally to mining machines of the [general] *continuous* type having a pair of boring arms for cutting a pair of overlapping contiguous bores in a seam of coal or the like, and particularly to a slack take-up device for the endless cutter chains for cutting the [cores] *cusps* resulting from the action of the boring arms in cutting such overlapping bores.

One of the principal objects of this invention is to provide a simple slack take-up device for the upper and lower cutter chains, particularly when the guides therefor are retracted.

*A further object of this invention is to provide a continuous type mining machine with a slack take-up device for the cutter chains which will maintain and control the amount of looseness or slack in the cutter chains during the movement of the cutter chain guides.*

*A still further object of this invention is to provide a tensioning means for the cutter chains of a continuous type mining machine for imposing the proper amount of tightness or tension in the cutter chains.*

*Another object of this invention is to provide a mining machine, of the type described, with a slack take-up device and tensioning means for maintaining and controlling the looseness or slack and imposing the proper amount of tightness or tension to an endless cutter chain during the movement of the cutter chain guide.*

Other objects and important features of the invention will be apparent from a study of the following specification taken with the drawings, which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown and described, such other embodiments being intended to be reserved especially as they fall within the scope and purview of the subjoined claims.

Figure 2:
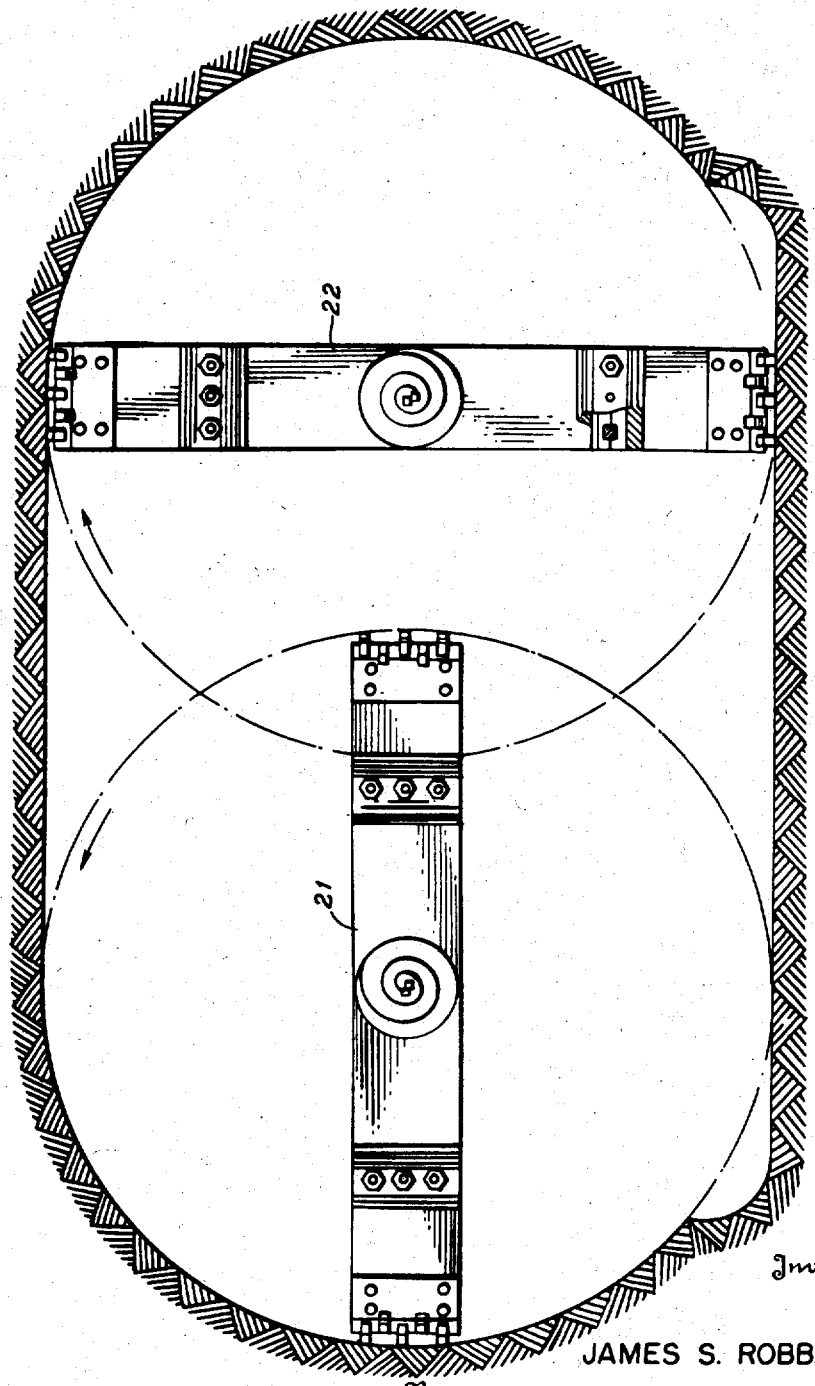
Figure 3:
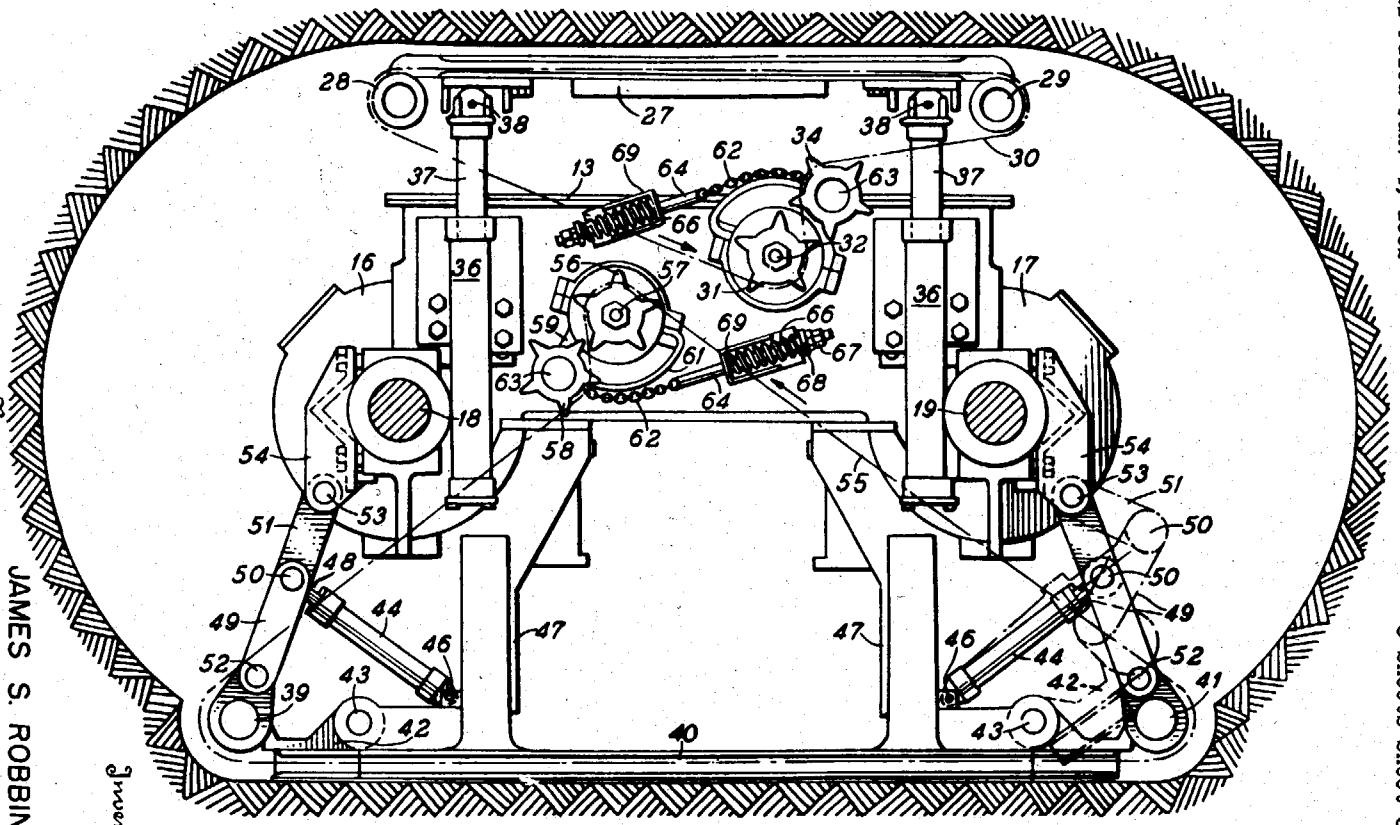

In the drawings:

Fig. 1 is a partial side elevation view of a continuous miner having embodied therein the improvements according to the present invention, said view being adjacent the forward portions of the machine only;

Fig. 2 is a front elevation view of the machine shown in Fig. 1 said view being taken in the direction of the arrows 2—2 of Fig. 1; and Fig. 3 is a front elevation view taken along the line 3—3 of Fig. 1 and looking in the direction of the arrows, showing the upper and lower chain guides and the endless cutter chains arranged to move on said guides, and the slack take-up devices *and tensioning means* therefor forming the improvement on the machine of the [general] *continuous* type referred to herein.

Referring now particularly to Fig. 1 of the drawings, there is shown the forward portion of a continuous miner indicated generally by the reference numeral 10. Such a miner includes a main frame 11 mounted for movement upon a pair of endless crawler treads 12. The main frame 11 forms a support for a[n auxiliary frame and] drive housing 13 *and includes an auxiliary frame which is* mounted for up and down movement in a vertical direction with respect to the main frame 11 by means of lifting cylinders 14. Other cylinders, not shown, are arranged to give tilting movement to the housing in vertical plane so as to accommodate pitching of a seam of coal or the like.

The drive housing 13 includes a pair of laterally spaced gear housings 16 and 17 which respectively have extending therefrom drive shafts 18 and 19 for *a pair of* boring arms 21 and 22, see also Fig. 2. [Boring] *The boring* arms 21 and 22 are driven in timed relationship in opposite directions by means of a gear train contained within the drive housing 13 and the spaced gear housings 16 and 17.

The aforesaid action of the boring arms 21 and 22 in cutting a pair of overlapping contiguous bores leaves behind an upper [core] *cusp* and a lower [core] *cusp*. In order to remove the [cores] *cusps* resulting from the action of the boring arms 21 and 22 endless cutter chains *30 and 55* are provided [having] *which have* a path of travel to the rear of the boring arms, as seen in Figs. 1 and 3.

To this end, see particularly Fig. 3, there is provided *a* channel-shaped upper cutter chain guide 27 having an idler sprocket or shoe 28 mounted at the left end thereof and a similar idler sprocket or shoe 29 mounted at the right end thereof. [An] *The* endless cutter chain 30 *is* arranged to travel in the guide 27 *and* is driven by a driving sprocket 31 mounted on a shaft 32 extending from a front wall of the drive housing 13. The endless chain 30 is additionally trained about an idler *member, such as a shoe or* sprocket 34, arranged under conditions, as will appear as this specification proceeds, to move in a partially orbital fashion with respect to the driving sprocket 31 [so as] to [at all times] take up the slack in the endless cutter chain 30 and to impose the proper amount of tension thereon at all times.

[Cutter] *The cutter* chain guide 27 is arranged to be moved vertically by means of a pair of laterally spaced lifting cylinders 36, 36 which are mounted on the [forward] *front* wall of the drive housing 13, and behind the plane of the boring arms 21, 22, as seen in Fig. 2. Each of the cylinders 36 has a piston *rod* 37 which is connected by a pin 38 to the upper chain guide 27, see Fig. 3.

As seen in Fig. 3, there is also provided a similar channel-shaped lower chain guide [38] *40* which is arranged to cut the lower [core] *cusp* remaining from the action of the boring arms 21, 22. The lower cutter chain guide [38] *40* has mounted at the left end thereof an idler sprocket or shoe 39, and the right end thereof has a similar idler sprocket or shoe 41. The two shoes or sprockets 39 and 41 are each mounted on rock arms 42 and pivoted at 43 to the guide [38] *40*. These rock arms 42 are arranged to be rocked to a collapsed position, as [seen] *illustrated in dot-dash lines* in the right hand part of Fig. 3, by means of [a] cylinder*s* 44 which [is] *are each* connected pivotally at 46 to a downward extension 47 from the drive housing 13. [The] *Each of the* cylinder*s* 44 has a piston *rod* 48 which is connected to the point of hinged connection 50 of a pair of links 49 and 51, link 49 being pivotally connected at 52 to the rock arm 42 and the link 51 being pivotally connected at 53 to a bracket 54 extendng from each gear [casing] *housing* 16 and 17.

As seen with respect to Fig. 3, the idler sprockets or shoes 39 and 41 are arranged to be rocked to collapsed position when fluid is admitted to the cylinders 44, the two links 49 and 51 tending to form an acute angle with respect to each other during such [application] *admission* of fluid *to the cylinders 44*.

[An] *The* endless chain 55 is trained around the shoes 39, 41 and across the lower guide [38] *40* and about a driving sprocket 56 mounted on a shaft 57 extending from the front *wall* of the drive housing 13. The chain [30] *55* is also trained around an idler *member, such as a shoe or* sprocket 58, arranged to move in a [partial obital] *partially orbital* fashion with respect to the driving sprocket 56 and is arranged to *take up and maintain the slack constant and to* impose the *proper* tension upon the endless chain 55.

The two idler [sprockets] *members* 34 and 58 which are arranged to move in a [partial obital] *partially orbital* fashion with respect to their respective driving sprockets 31 and 56 will now be described. The description [obtaining] for the idler [sprocket] *member* 58 and its support about the driving sprocket 56 will suffice also for the idler [sprocket] *member* 34, and so the description for the idler [sprocket] *member* 34 will not be repeated.

The idler [sprocket] *member* 58 is accordingly mounted upon an arm 59 having a center corresponding to the center of the shaft 57. The arm 59 is also provided with *a guide in the form of* an arcuate surface 61 [,] *which is substantially coincident with the path of travel or swinging movement of the idler member 58 in the partially orbital fashion about the driving sprocket 56* and a flexible strand 62 is anchored at one end to a stub shaft 63 supporting the idler [sprocket] *member* 58 upon the arm 59. The flexible strand 62 is connected *at its other end* to a rod 64 encircled by a spring 66 which is adjusted in tension by adjusting nuts 67. One end of the spring 66 abuts a washer 68 bearing against the adjusting nuts 67 and the other end of the spring is bottomed in an essentially U-shaped stirrup 69 which is secured as by welding to the [forward] *front* wall of the drive housing 13.

When it is desired to remove the machine 10 from [the] *a location or* room in which it operates, the upper cutter chain guide *27* is retracted by means of the cylinders 36, 36. The shoes 39 and 41 at the lower cutter chain guide [38] *40* are likewise retracted by means of the cylinders 44, 44. Ordinarily the entire boring means and the lower chain guide may be lifted from the mine floor by means of *the* lifting cylinders 14, as seen in Fig. 1.

Upon such movement of the upper cutter chain [bar] *guide* 27 and the rock arms 42, 42, the idler sprockets 34 and 58 will be urged by the spring 66, which normally tends to elongate, to rock the two idler [sprockets] *members* 34 and 58 in a counter-clockwise direction with respect to their associated driving sprockets 31 and 56, thereby storing, *tensioning and/*or taking up the *slack in the* chain during such retraction of the machine.

From the foregoing description it is believed and readily understood that a simple means has been provided for taking up *slack in* the cutter chains [as may be] occasioned by retraction of the upper cutter chain [bar] *guide* and the lower cutter chain [bar] *guide*, the take-up being additionally characterized by imposing at all times the proper amount of tension upon the chain.

This application is a division of my copending application Serial No. 264,880, filed January 4, 1952, for Coal Mining Machines, now Patent No. 2,705,624.

While the invention has been described in terms of a preferred embodiment thereof it is intended that the scope thereof be limited only by the terms of the claims here appended.

I claim as my invention:

1. In a mining machine of the type having a pair of boring arms arranged to cut contiguous bores [in a seam of coal or the like], at least one retractable cutter chain guide and an endless cutter chain guided thereby for cutting a cusp remaining from the action of said boring arms, and a driving sprocket for said cutter chain, the improvement in such mining machine which comprises: means for taking up [the] slack in said cutter chain occasioned by movement of said cutter chain guide to retracted position comprising an idler sprocket, an arm supporting said idler sprocket and mounted for swinging movement[, said arm having its] *about a* center of swinging movement corresponding to the center of rotation of said driving sprocket, a guide upon said arm, said guide having an arcuate surface substantially coincident with the [path of travel] *swinging movement* of said idler sprocket about said driving sprocket, and means for enabling said idler sprocket to move in a take-up direction to take up [the] slack in said cutter chain at all times, said means comprising a flexible strand secured to said arm and wrapped along said arcuate surface, and a spring connected at one end to said strand and at the other end to said machine for urging said arm together with said idler sprocket in [a] *the* take up direction.

2. In a mining machine of the type having a pair of boring arms arranged to cut contiguous bores [in a seam of coal or the like], at least one retractable cutter chain guide and an endless cutter chain guided thereby for cutting a cusp remaining from the action of said boring arms, and a driving sprocket for said cutter chain, the improvement in such mining machine which comprises: means for taking up [the] slack in said cutter chain occasioned by movement of said cutter chain guide to retracted position comprising an idler sprocket, an arm supporting said idler sprocket and mounted for swinging movement[, said arm having its] *about a* center of swinging movement corresponding to the center of rotation of said driving sprocket, a guide upon said arm, said guide having an arcuate surface substantially coincident with the [path of travel] *swinging movement* of said idler sprocket about said driving sprocket, and means for enabling said idler sprocket to move in a take-up direction to take up [the] slack in said cutter chain at all times, said means comprising a flexible strand secured to said arm and wrapped along said arcuate surface, and resilient means connected to said flexible strand and urging said arm together with said idler *sprocket* in [a] *the* take-up direction.

*3. In a mining machine of the type having a pair of boring arms arranged to cut contiguous bores, at least one retractable cutter chain guide and an endless cutter chain guided thereby for cutting a cusp remaining from the action of said boring arms, and a drive means for said cutter chain, the improvement in such mining machine which comprises: means swingably movably supported by the mining machine for taking up slack in said cutter chain occasioned by movement of said cutter chain guide, said means including an arcuate surface substantially coincident with the swinging movement of the means, and other means for enabling and urging said first mentioned means to move in a direction to take up slack in said cutter chain, said other means including flexible means secured to said first mentioned means and disposed along said arcuate surface.*

*4. In a mining machine of the type having a pair of boring arms arranged to cut contiguous bores, at least one retractable cutter chain guide and an endless cutter chain guided thereby for cutting a cusp remaining from the action of said boring arms, and a drive means for said cutter chain, the improvement in such mining machine which comprises: means for taking up slack in said cutter chain occasioned by movement of said cutter chain guide to retracted position, said means including an arm supporting an idler member and mounted for swinging*

*movement on said mining machine, an arcuate guide surface on said arm substantially coincident with the swinging movement of the idler sprocket, and means including flexible means secured to said arm and disposed along the arcuate guide surface for urging said arm and idler member to move in a direction to take up slack in said cutter chain.*

*5. In a mining machine of the type having a pair of boring arms arranged to cut contiguous bores, at least one retractable cutter chain guide and an endless cutter chain guided thereby for cutting a cusp remaining from the action of said boring arms, and a driving sprocket for said cutter chain, the improvement in such mining machine which comprises: means for taking up slack and maintaining the proper tension in said cutter chain during movement of said cutter chain guide to retracted position, said means including an idler sprocket, an arm supporting said idler sprocket and pivotally mounted on said mining machine for swinging movement about a center of swinging movement corresponding to the center of rotation of said driving sprocket, a guide means on said arm having an arcuate surface substantially coincident with the swinging movement of the idler sprocket about said driving sprocket, flexible means secured to said*

*arm and disposed along said arcuate surface for enabling the arm to move in a direction to take up slack in said cutter chain, and resilient means connected to said flexible means for urging said arm in the take-up direction to maintain the proper tension on the cutter chain.*

References Cited in the file of this patent or the original patent

UNITED STATES PATENTS

| | | |
|---|---|---|
| 1,505,940 | Berryman | Aug. 26, 1924 |
| 1,660,520 | Nielson et al. | Feb. 28, 1928 |
| 1,726,963 | McKinlay | Sept. 3, 1929 |
| 2,189,670 | Lewis | Feb. 6, 1940 |
| 2,280,021 | Askue | Apr. 14, 1942 |
| 2,753,169 | Joy | July 3, 1956 |

FOREIGN PATENTS

| | | |
|---|---|---|
| 567,964 | France | Dec. 14, 1923 |

OTHER REFERENCES

"Coal Age," May 13, 1926, pp. 667–670.

"Mining Congress Journal," October 1938, pp. 44 and 70.